United States Patent
Duan et al.

(10) Patent No.: US 12,509,374 B2
(45) Date of Patent: Dec. 30, 2025

(54) SYSTEM AND METHOD FOR SOFTENING HIGH-SALINITY WATER VIA SELF-INDUCED CALCIUM BICARBONATE CRYSTALLIZATION IN FLUIDIZED BED

(71) Applicant: Greentech Environment Co., Ltd., Beijing (CN)

(72) Inventors: Mengyuan Duan, Beijing (CN); Zehua Li, Beijing (CN); Mu Liu, Beijing (CN); Pengchuan Zhang, Beijing (CN); Xikun Zhu, Beijing (CN); Liyan Zhang, Beijing (CN); Kai Sun, Beijing (CN)

(73) Assignee: Greentech Environment Co., Ltd., Beijing (CN)

( * ) Notice: Subject to any disclaimer, the term of this patent is extended or adjusted under 35 U.S.C. 154(b) by 0 days.

(21) Appl. No.: 19/242,957

(22) Filed: Jun. 18, 2025

(65) Prior Publication Data
US 2025/0313498 A1    Oct. 9, 2025

(30) Foreign Application Priority Data
Aug. 22, 2024  (CN) .......................... 202411155131.7

(51) Int. Cl.
*C02F 1/66* (2023.01)
*B01D 21/00* (2006.01)
(Continued)

(52) U.S. Cl.
CPC ............ *C02F 1/66* (2013.01); *B01D 21/0045* (2013.01); *C02F 1/008* (2013.01); *C02F 5/06* (2013.01);
(Continued)

(58) Field of Classification Search
None
See application file for complete search history.

(56) References Cited

U.S. PATENT DOCUMENTS

| | | | |
|---|---|---|---|
| 2006/0196836 A1* | 9/2006 | Arakel | C02F 1/441 |
| | | | 210/723 |
| 2015/0329369 A1 | 11/2015 | Heidel et al. | |

(Continued)

FOREIGN PATENT DOCUMENTS

| | | |
|---|---|---|
| CN | 106115942 A | 11/2016 |
| CN | 114873745 A | 8/2022 |
| CN | 117228802 A | 12/2023 |

*Primary Examiner* — Richard C Gurtowski (57) ABSTRACT

A system for softening high-salinity water via self-induced calcium bicarbonate crystallization in a fluidized bed, including a fluidized bed-based crystallization-softening reaction unit, a water feeding unit, a dosing unit and a regulation unit. The fluidized bed-based crystallization-softening reaction unit is configured to induce a crystallization reaction to soften high-salinity water. The water feeding unit is configured to supply high-salinity water to the fluidized bed-based crystallization-softening reaction unit. The dosing unit is configured to supply a pH regulating agent to the fluidized bed-based crystallization-softening reaction unit. The regulation unit is configured to perform reflux replenishment for the fluidized bed-based crystallization-softening reaction unit and recover escaping crystals. A high-salinity water softening method using such system is also provided.

9 Claims, 2 Drawing Sheets

(51) Int. Cl.
  *C02F 1/00*   (2023.01)
  *C02F 5/06*   (2023.01)
  *C02F 1/52*   (2023.01)
  *C02F 101/10*   (2006.01)

(52) U.S. Cl.
  CPC .................. *C02F 2001/007* (2013.01); *C02F 2001/5218* (2013.01); *C02F 2101/10* (2013.01); *C02F 2201/005* (2013.01); *C02F 2209/005* (2013.01); *C02F 2209/03* (2013.01); *C02F 2209/06* (2013.01); *C02F 2209/11* (2013.01); *C02F 2209/44* (2013.01); *C02F 2301/046* (2013.01)

(56) References Cited

U.S. PATENT DOCUMENTS

| | | |
|---|---|---|
| 2020/0290909 A1 | 9/2020 | Christy |
| 2023/0234870 A1 | 7/2023 | Liu et al. |

* cited by examiner

SYSTEM AND METHOD FOR SOFTENING HIGH-SALINITY WATER VIA SELF-INDUCED CALCIUM BICARBONATE CRYSTALLIZATION IN FLUIDIZED BED

CROSS-REFERENCE TO RELATED APPLICATIONS

This application claims the benefit of priority from Chinese Patent Application No. 202411155131.7, filed on Aug. 22, 2024. The content of the aforementioned application, including any intervening amendments made thereto, is incorporated herein by reference in its entirety.

TECHNICAL FIELD

This application relates to water treatment, and more particularly to a system and method for softening high-salinity water via self-induced calcium bicarbonate crystallization in a fluidized bed.

BACKGROUND

Temporary hardness refers to the potential precipitation amount formed by calcium and magnesium ions in water in the presence of high levels of dissolved carbonate substances (including carbonates, bicarbonates, carbonic acid and carbon dioxide), usually characterized by the calcium carbonate content. Water with high temporary hardness will easily causing scaling, thereby easily leading to membrane fouling, filter media pore blockage, and aeration hole clogging during the water treatment processes. Therefore, softening is a necessary step to ensure the normal operation of other treatment units during the treatment of the water with high temporary hardness.

Calcium bicarbonate has a relatively low solubility (approximately 1,330 mg/L). If the concentration of free calcium bicarbonate in water is not lower than this value, it indicates that calcium ions and bicarbonate ions in the water tend to transition from an unsaturated state to a metastable or supersaturated state, meeting the prerequisite for the spontaneous formation of calcium bicarbonate crystal nuclei and subsequent crystallization. Therefore, it is theoretically feasible to promote the equilibrium of carbonate ionization and hydrolysis to shift toward the formation of bicarbonates through pH adjustment, thereby enabling the softening of high-salinity water (i.e., reverse osmosis concentrate) through calcium bicarbonate crystallization.

Chinese patent publication No. 114873745A discloses a treatment system and method for reverse osmosis concentrates with high temporary hardness, which involve a relatively long hydraulic retention time, resulting in low treatment efficiency. In addition, the resultant calcium bicarbonate crystals have a relatively small particle size, which will increase the loss during subsequent dewatering processes.

Therefore, it is urgent needed to develop a system and method that can not only effectively reduce hydraulic retention time, improve treatment efficiency, and increase the particle size of the formed calcium bicarbonate crystals, but also address the issues such as non-uniform fluidized bed and partial crystal loss.

SUMMARY

An object of the disclosure is to provide a system and method for softening high-salinity water via self-induced calcium bicarbonate crystallization in a fluidized bed to address the issues in the prior art such as uneven crystal particle size, non-uniform fluidization and potential crystal loss. This application does not need additional introduction of seed crystals, and can achieve the softening of high-salinity water through self-induced crystallization of calcium bicarbonate.

Technical solutions of the present disclosure are described as follows.

In a first aspect, this application provides a system for softening saline water via self-induced calcium bicarbonate crystallization in fluidized bed, comprising:
  a fluidized bed-based crystallization-softening reaction unit;
  a water feeding unit;
  a dosing unit; and
  a regulation unit;
  wherein the fluidized bed-based crystallization-softening reaction unit is configured to induce a crystallization reaction to soften a saline water;
  the water feeding unit is configured to supply the saline water to the fluidized bed-based crystallization-softening reaction unit;
  the dosing unit is configured to supply a pH regulating agent to the fluidized bed-based crystallization-softening reaction unit;
  the regulation unit is configured to perform reflux replenishment for the fluidized bed-based crystallization-softening reaction unit and recover escaping crystals;
  the fluidized bed-based crystallization-softening reaction unit comprises a crystallization-softening fluidized bed reactor;
  the crystallization-softening fluidized bed reactor comprises a mixing module, a reaction module, a transition module and a clarification module sequentially connected from bottom to top;
  the clarification module is connected to the mixing module through a return pipe;
  an end of the return pipe adjacent to the clarification module is provided with a return valve; and the return pipe is further provided with a return pump and a first online pressure gauge;
  a bottom of the mixing module is connected to a crystal discharge pipe; the crystal discharge pipe is provided with a crystal discharge valve adjacent to the mixing module; and the mixing module is provided with a second online pressure gauge;
  a side wall of the reaction module is connected to a liquid discharge pipe; the liquid discharge pipe is provided with a liquid discharge valve adjacent to the reaction module;
  the liquid discharge pipe is further provided with a liquid discharge pump; and the reaction module is provided with an online pH meter;
  an upper end of a side wall of the clarification module or a top of the clarification module is connected to an outlet pipe; and the clarification module is provided with an online turbidity meter;
  the water feeding unit comprises a water feeding tank; a bottom of the water feeding tank is connected to the mixing module through an inlet pipe; the inlet pipe is provided with an inlet valve adjacent to the water feeding tank; and the inlet pipe is further provided with an inlet pump and a third online pressure gauge;
  the dosing unit comprises a dosing tank; a bottom of the dosing tank is connected to the mixing module through a dosing pipe; the dosing pipe is provided with a dosing valve adjacent to the dosing tank; and the dosing pipe is further provided with a dosing pump and a fourth online pressure gauge;

the regulation unit comprises a secondary sedimentation tank; a bottom of the secondary sedimentation tank is connected to an upper end of a side wall of the water feeding tank or a top of the water feeding tank through a crystal supply pipe; the crystal supply pipe is provided with a crystal supply valve adjacent to the secondary sedimentation tank; and the crystal supply pipe is further provided with a crystal supply pump;

a middle of a side wall of the secondary sedimentation tank is connected to the return pipe through a water supply pipe; and the water supply pipe is provided with a water supply valve adjacent to the secondary sedimentation tank;

a top of the secondary sedimentation tank is connected to the reaction module through the liquid discharge pipe, and is connected to the clarification module through the outlet pipe; and an upper end of the side wall of the secondary sedimentation tank is provided with a supernatant overflow port.

The following technical solutions are presented as preferred technical solutions of the present disclosure and are not intended to limit the scope of the disclosure. Through the implementation of the following technical solutions, the objectives and advantageous effects of the present disclosure can be better achieved.

In some embodiments, the mixing module has an inverted conical shape, the reaction module has a cylindrical shape, the transition module has an inverted truncated-cone shape, and the clarification module has a cylindrical shape;

a diameter of the clarification module is greater than a diameter of the reaction module;

a lower end of the clarification module is connected to a lower end of the mixing module through the return pipe;

the return pipe is further provided with a check valve adjacent to the mixing module;

the online pH meter is provided at a bottom end of the reaction module; and the online turbidity meter is provided at the lower end of the clarification module at a position not higher than a connection point of the return pipe to the clarification module.

In some embodiments, the water feeding tank is provided with a first agitator;

the inlet pipe is provided with a first check valve adjacent to the mixing module;

the top of the water feeding tank is connected to a saline water delivery pipe.

In this embodiment, one end of the saline water delivery pipe is connected to the top of the water feeding tank, and the other end of the saline water delivery pipe is connected to a process unit (e.g., a concentrate side of a reverse osmosis system) that generates saline water for supplying saline water to the water feeding tank.

In some embodiments, the dosing tank is provided with a second agitator;

the dosing pipe is provided with a second check valve adjacent to the mixing module;

the secondary sedimentation tank is a sloping plate sedimentation tank; and the crystal supply pipe is provided with a third check valve adjacent to the water feeding tank.

In some embodiments, the crystal supply pump is a cutting-type submersible sewage pump.

In some embodiments, the water supply pipe is provided with a fourth check valve adjacent to the return pipe; and a connection between the liquid discharge pipe and the secondary sedimentation tank and a connection between the outlet pipe and the secondary sedimentation tank are higher than the supernatant overflow port.

In some embodiments, the supernatant overflow port is connected to an advanced treatment process unit, which includes a biofilter and/or ultrafiltration equipment.

In some embodiments, the system provided herein further comprises a programmable logic controller (PLC)-based control system;

the PLC-based control system is configured to control the fluidized bed-based crystallization-softening reaction unit, the water feeding unit, the dosing unit and the regulation unit to achieve automated operation.

In this embodiment, the PLC-based control system is connected to pumps, valves, instruments in each unit to enable fully automated and digitalized operation.

In a second aspect, this application provides a saline water softening method using the system provided herein, comprising:

(S1) in an initial condition, filling the crystallization-softening fluidized bed reactor with softened water, and maintaining a liquid level of the softened water above a connection between the return pipe and the clarification module;

wherein the softened water refers to water containing calcium ions at a concentration of less than 0.1 mg/L and bicarbonate at a concentration of less than 3 mg/L, such as reverse osmosis permeate;

storing a to-be-treated saline water in the water feeding tank, wherein a concentration of calcium ions in the to-be-treated saline water is a mg/L, a concentration of bicarbonate in the to-be-treated saline water is b mg/L, and $a \times b^2 \geq 3.275 \times 10^8$, i.e., an ion product of calcium ions and bicarbonate is not lower than the solubility product constant of calcium bicarbonate; and storing the pH regulating agent in the dosing tank, wherein the pH regulating agent is in a form of an emulsion with a weight percentage concentration F, wherein $1\% \leq F \leq 10\%$, including but not limited to values such as 1% to 10% in 1% increments;

wherein, an appropriate concentration of the pH regulating agent facilitates the stable operation of the system; if the concentration of the pH regulating agent is too high, it may cause clogging of the dosing pipe; and if the concentration of the pH regulating agent is too low, a flow rate of the pH regulating agent may significantly disturb the fluidization velocity of the crystallization-softening fluidized bed reactor;

(S2) activating the system; measuring, by the online turbidity meter, a turbidity value of water in the clarification module;

if the turbidity value is less than 1500 NTU, proceeding to the following steps:

activating the inlet pump, the return pump and the dosing pump; opening the inlet valve, the return valve and the dosing valve; closing the water supply valve, the crystal supply valve and the liquid discharge valve; and stopping the crystal supply pump and the liquid discharge pump;

feeding the to-be-treated saline water from the water feeding tank into the mixing module through the inlet pipe at a first preset flow rate $Q_1$ m³/h; feeding the softened water from the clarification module into the mixing module through the return pipe at a second preset flow rate $Q_2$ m³/h; and feeding the pH regulating agent from the dosing tank into the mixing module through the dosing pipe at a third preset flow rate $q_3$ m³/h to form a mixed fluid;

allowing the mixed fluid to enter the reaction module to form a fluidized bed composed of solid-phase calcium bicarbonate crystal and liquid-phase softened water; transferring the softened water into the clarification module, wherein one portion of the softened water is allowed to enter the mixing module through the return pipe at the second preset flow rate $Q_2$ m³/h, and the other portion of the softened water is allowed to enter the secondary sedimentation tank through the outlet pipe; and subjecting the softened water in the secondary sedimentation tank to sedimentation to obtain a supernatant, and discharging the supernatant from the supernatant overflow port;

defining a first preset hydraulic retention time between a top end and a bottom end of the reaction module as $I_1$ h, wherein $I_1$ is less than or equal to 0.5;

in a case where a stable fluidized bed composed of large particles (with a particle size greater than 50 μm) and a liquid phase is formed between a connection of the liquid discharge pipe on the side wall of the reaction module and the bottom end of the reaction module, and a calcium ion removal rate of not less than 80% is achieved, defining a second preset hydraulic retention time between the connection of the liquid discharge pipe on the side wall of the reaction module and the bottom end of the reaction module as $I_2$ h, wherein $I_2$ is greater than or equal to $$\frac{1}{4} h;$$

based on the limitation on the liquid discharge connection position, $I_1$ is greater than or equal to $I_2$;

if the turbidity value is greater than or equal to 1500 NTU, proceeding to the following steps:

closing the return valve, and opening the water supply valve;

stopping return of the softened water from the clarification module, and feeding the supernatant from the secondary sedimentation tank into the mixing module at the second preset flow rate $Q_2$ m³/h through the water supply pipe and the return pipe;

intermittently opening the liquid discharge valve and activating the liquid discharge pump;

intermittently discharging a fluid located between the connection of the liquid discharge pipe on the side wall of the reaction module and the top end of the reaction module into the secondary sedimentation tank through liquid discharge pipe at a fourth preset flow rate $q_4$ m³/h;

wherein, pilot-scale test results indicate that during a certain period after the initial startup of the system disclosed herein, due to the relatively low proportion of large particles in the fluidized bed, a significant amount of small particle crystals may escape (i.e., some small particle crystals may enter the return pipe together with the softened water treated by the clarification module); the escaping crystals entering the return pipe may cause insufficient flow in the softened water recirculation; therefore, when the online turbidity meter detects that escaping crystals begin to enter the clarification module, transition should be performed using the aforementioned method until the fluidized bed stabilizes;

denoting pressure values measured by the second online pressure gauge, the third online pressure gauge, the first online pressure gauge and the fourth online pressure gauge as $P_0$, $P_1$, $P_2$, and $P_3$, respectively;

in a case that $P_0 > P_1$, $P_0 > P_2$ and $P_0 > P_3$, closing the crystal discharge valve; and in a case that at least one of $P_0 \leq P_1$, $P_0 \leq P_2$, or $P_0 \leq P_3$ is satisfied, opening the crystal discharge valve; and discharging a portion of the calcium bicarbonate crystals in a form of slurry through the crystal discharge pipe until the dynamic pressure in the mixing module drops below that in the crystal discharge pipe, thereby preventing suppression of the feedwater, recirculation and dosing processes.

In some embodiments, in the system, continuous stirring is performed in the water feeding tank and the dosing tank respectively by the first agitator and the second agitator; and/or the pH regulating agent comprises calcium hydroxide;

wherein the second agitator is continuously operated to prevent unstable dosing of active ingredients caused by stratification or precipitation of the chemical agent.

In some embodiments, in a case that $$a \leq \frac{20}{61}b, \ Q_2 = \left(\frac{81}{26600}a - 1\right) \times Q_1;$$

in a case that $$a > \frac{20}{61}b, \ Q_2 = \left(\frac{81}{81160}b - 1\right) \times Q_1; \text{ and } q_3 = \frac{Q_1}{1000 \ F};$$

wherein a is the concentration of calcium ions in the to-be-treated saline water, mg/L; b is the concentration of bicarbonate in the to-be-treated saline water, mg/L; and F is the weight percentage concentration of the pH regulating agent.

In this embodiment, when calcium bicarbonate in the saline water is in a supersaturated state, it tends to rapidly form a large number of crystal nuclei under crystallization-favorable conditions, rather than gradually aggregating onto existing nuclei to form particulate crystals. Therefore, a proper amount of softened water is recirculated to dilute the calcium bicarbonate content in the saline water to a saturation threshold value at the moment it enters the crystallization-softening fluidized bed reactor, so as to ensure that the calcium bicarbonate is in a metastable state rather than a supersaturated state, thereby promoting crystal growth in particle size.

In this embodiment, when $$\frac{a}{1330 \times \frac{40}{162}} \leq \frac{b}{1330 \times \frac{122}{162}},$$

i.e., $$a \leq \frac{20}{61}b,$$

the supersaturation of calcium ions is not higher than that of bicarbonate, dilution is performed based on calcium ions, such that $$\frac{Q_1 + Q_2}{Q_1} = \frac{a}{1330 \times \frac{40}{162}},$$

which can be simplified as $$Q_2 = \left(\frac{81}{26600}a - 1\right)Q_1.$$

When $$\frac{a}{1330 \times \frac{40}{162}} > \frac{b}{1330 \times \frac{122}{162}},$$

i.e., $$a > \frac{20}{61}b,$$

the supersaturation of bicarbonate is lower than that of calcium ions, dilution is performed based on bicarbonate, such that $$\frac{Q_1 + Q_2}{Q_1} = \frac{b}{1330 \times \frac{122}{162}},$$

which can be simplified as $$Q_2 = \left(\frac{81}{81130}b - 1\right)Q_1.$$

It should be noted that "1330" refers to the solubility product constant of calcium bicarbonate, mg/L, having the same unit as both a and b.

In some embodiments, a radius of the reaction module is K, m, and $$R = \sqrt{\frac{Q_1 + Q_2}{4.75\pi}},$$

wherein $Q_1$ is the first preset flow rate, m³/h, and $Q_2$ is the second preset flow rate, m³/h.

In this embodiment, the radius R of the reaction module is calculated based on the formula:

$$R = \sqrt{\frac{Q_1 + Q_2}{1.3187 \times 10^{-3} \times 3600\pi}},$$

where $Q_1$ is the first preset flow rate, m³/h, $Q_2$ is the second preset flow rate, m³/h. It should be noted that, the constant "1.3187×10⁻³" is the fluid superficial velocity at a stabilized fluidized bed state, calculated based on the fluidized bed model and calcium bicarbonate crystal parameters, m/s, and "3600" is a time conversion constant, s/h.

In some embodiments, a height from the top end to the bottom end of the reaction module is $H_1$ m, and $$H_1 = \frac{(Q_1 + Q_2) \times I_1}{\pi R^2},$$

wherein $Q_1$ is the first preset flow rate, m³/h, $Q_2$ is the second preset flow rate, m³/h, R is the radius of the reaction module, m, and $I_1$ is the first preset hydraulic retention time, h.

In some embodiments, a height between the connection of the liquid discharge pipe on the side wall of the reaction module and the bottom end of the reaction module is $H_2$ m, and $$H_2 = \frac{(Q_1 + Q_2) \times I_2}{\pi R^2},$$

wherein $Q_1$ is the first preset flow rate, m³/h, $Q_2$ is the second preset flow rate, m³/h, R is the radius of the reaction module, m, and $I_2$ is the second preset hydraulic retention time, h.

In some embodiments, a third preset hydraulic retention time in the secondary sedimentation tank is $I_3$ h, and $I_3$ is greater than or equal to ⅙ h; and wherein $I_3$ can be ⅙ h, ⅕ h, ¼ h, ⅓ h, ½ h, or 1 h, but the scope is not limited to the enumerated values, and other non-enumerated values within this range are equally applicable.

In some embodiments, based on pilot-scale test results, a portion of fine escaping crystals may pass through the clarification module and subsequently be conveyed into the secondary sedimentation tank along with the softened water. According to the pilot-scale experience, it takes at least 10 min for the escaping crystals to settle in the secondary sedimentation tank.

In some embodiments, in a case that a measured value of the online pH meter is greater than 8.30, stopping the dosing pump and closing the dosing valve to stop feeding the pH regulating agent;

in a case that the measured value of the online pH meter is less than 8.00, activating the dosing pump and opening the dosing valve to start feeding the pH regulating agent; and in a case that the measured value of the online pH meter is greater than or equal to 8.00 and less than or equal to 8.30, maintaining the dosing pump and the dosing valve in their current states, respectively.

In some embodiments, in the step of intermittently discharging the fluid between the connection of the liquid discharge pipe on the side wall of the reaction module and the top end of the reaction module into the secondary sedimentation tank through the liquid discharge pipe at the fourth preset flow rate $q_4$ m³/h:

$q_4 > Q_1 + Q_2$, wherein $Q_1$ is the first preset flow rate, m³/h, and $Q_2$ is the second preset flow rate, m³/h;

each discharge lasts for $t_1$ h, and an interval between adjacent two discharge operations is $t_2$ h;

wherein $$t_1 = \frac{V + \frac{(H_1 - H_2) \times \pi R^2}{2}}{q_4}; \text{ and } t_2 = \frac{V + \frac{(H_1 - H_2) \times \pi R^2}{2}}{Q_1 + Q_2};$$

wherein, V is a total volume of the transition module and the clarification module, m$^3$; $H_1$ is the height from the top end to the bottom end of the reaction module, m; $H_2$ is the height between the connection of the liquid discharge pipe on the side wall of the reaction module and the bottom end of the reaction module, m; R is the radius of the reaction module, m; $Q_1$ is the first preset flow rate, m$^3$/h; and $Q_2$ is the second preset flow rate, m$^3$/h.

In some embodiments, during operation of the system, the crystal supply valve is intermittently opened, and the crystal supply pump is intermittently activated, so as to transfer calcium bicarbonate crystals escaping into the secondary sedimentation tank to the water feeding tank in the form of slurry.

In some embodiments, those skilled in the art, based on specific operational conditions, the settled escaping crystals from the secondary sedimentation tank are intermittently introduced into the water feeding tank in the form of the slurry. The water feeding tank is continuously stirred by the first agitator to ensure thorough and uniform mixing of the incoming escaping crystals with the saline water, thereby preventing their deposition and retention in the water feeding tank. The continuous stirring helps prevent algae growth in the saline water due to prolonged stagnation when escaping crystals are not being introduced into the water feeding tank.

Compared to the prior art, the present disclosure has the following beneficial effects.

(1) The system and method for softening high-salinity water via self-induced calcium bicarbonate crystallization in a fluidized bed disclosed herein achieve self-induced formation of calcium bicarbonate crystals without the need for externally added seed crystals through the design of the return pipe and the regulation unit. This configuration not only achieves the softening of high-salinity but also addresses issues related to uneven crystal particle size, non-uniform fluidization and potential crystal loss. Moreover, the entire process operates automatically with precise control, reducing labor costs and facilitating industrial application.

(2) The system and method disclosed herein enable a significant increase in the particle size of the obtained resource product (calcium bicarbonate crystals), thereby simplifying the dehydration process and reducing product loss during dehydration.

(3) The disclosed system and method effectively reduce hydraulic retention time, thereby improving treatment efficiency.

BRIEF DESCRIPTION OF THE DRAWINGS

The accompanying drawings are provided to facilitate the understanding of the technical solutions of the present disclosure, and form a part of the specification to illustrate the disclosure together with the embodiments. The accompanying drawings are illustrative and exemplary, and are not intended to limit the disclosure.

In order to illustrate the technical solutions in the embodiments of the present disclosure or the prior art more clearly, the accompanying drawings needed in the description of the embodiments or prior art will be briefly described below. Obviously, presented in the accompanying drawings are only some embodiments of the present disclosure, and for those of ordinary skill in the art, other accompanying drawings can be obtained from the structures illustrated therein without making creative effort.

In the figures: 100—crystallization-softening fluidized bed reactor; 110—mixing module; 120—reaction module; 130—transition module; 140—clarification module; 150—return pipe; 111—crystal discharge pipe; 112—crystal discharge valve; 113—second online pressure gauge; 121—liquid discharge pipe; 122—liquid discharge valve; 123—liquid discharge pump; 124—online pH meter; 131—outlet pipe; 132—online turbidity meter; 151—return valve; 152—return pump; 153—first online pressure gauge; 154—first check valve; 200—water feeding tank; 210—inlet pipe; 211—inlet valve; 212—inlet pump; 213—third online pressure gauge; 214—second check valve; 220—first agitator; 230—saline water delivery pipe; 300—dosing tank; 310—dosing pipe; 311—dosing valve; 312—dosing pump; 313—fourth online pressure gauge; 314—third check valve; 320—second agitator; 400—secondary sedimentation tank; 410—crystal supply pipe; 411—crystal supply valve; 412—crystal supply pump; 413—fourth check valve; 420—water supply pipe; 421—water supply valve; 422—fifth check valve; and 430—supernatant overflow port.

DETAILED DESCRIPTION OF EMBODIMENTS

To facilitate the understanding of the objectives, features, and advantages of the present disclosure, the disclosure will be described in detail below with reference to embodiments and accompanying drawings. It should be noted that the embodiments of the present disclosure and the features therein may be combined in the absence of contradiction.

Many specific details are provided below to facilitate a comprehensive understanding of the present disclosure. However, it should be noted that the disclosure may be implemented in ways other than those explicitly described herein. It is obvious that described herein are merely some embodiments of the present disclosure, instead of all embodiments.

Figure 1:
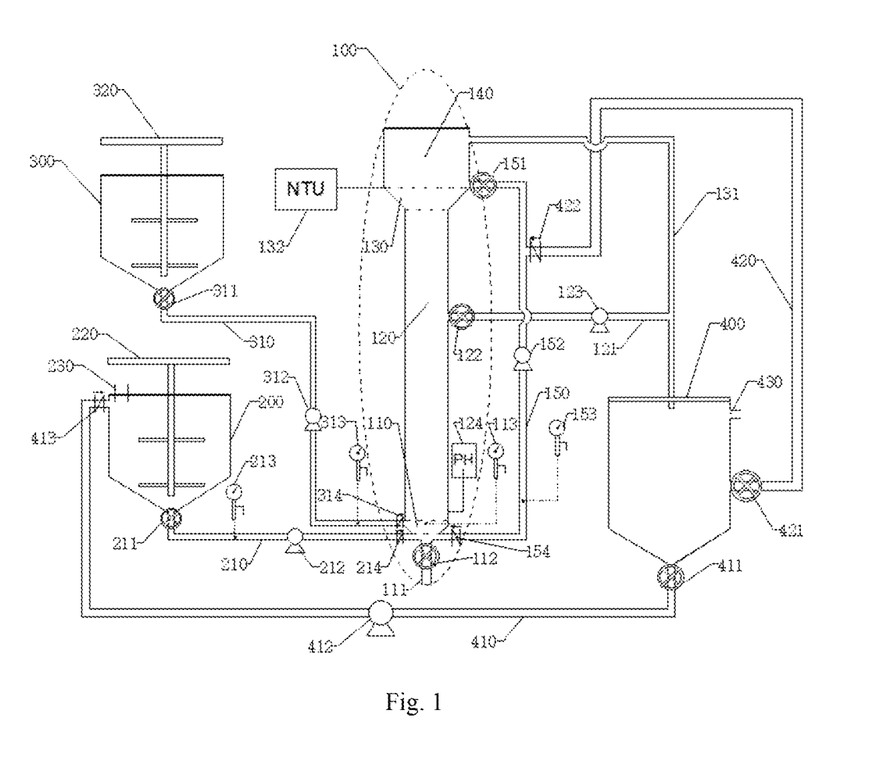
FIG. 1 a structural diagram of a system for softening saline water via self-induced calcium bicarbonate crystallization in fluidized bed according to an embodiment of the present disclosure.

As illustrated structurally in FIG. 1, an embodiment of the present disclosure provides a system for softening saline water via self-induced calcium bicarbonate crystallization in fluidized bed, including a fluidized bed-based crystallization-softening reaction unit, a water feeding unit, a dosing unit and a regulation unit. It should be noted that a programmable logic controller (PLC)-based control system and associated circuitry structures, although not shown in FIG. 1, are actually present in the system.

The fluidized bed-based crystallization-softening reaction unit is configured to induce a crystallization reaction to soften a saline water. The water feeding unit is configured to supply the saline water to the fluidized bed-based crystallization-softening reaction unit. The dosing unit is configured to supply a pH regulating agent to the fluidized bed-based crystallization-softening reaction unit. The regulation unit is configured to perform reflux replenishment for the fluidized bed-based crystallization-softening reaction unit and recover escaping crystals.

The fluidized bed-based crystallization-softening reaction unit includes a crystallization-softening fluidized bed reactor 100. The crystallization-softening fluidized bed reactor 100 includes a mixing module 110, a reaction module 120, a transition module 130 and a clarification module 140. The mixing module 110, the reaction module 120, the transition module 130 and the clarification module 140 are sequentially connected from bottom to top. The clarification module 140 is connected to the mixing module 110 through a return pipe 150. An end of the return pipe 150 adjacent to the clarification module 140 is provided with a return valve 151. The return pipe 150 is further provided with a return pump 152 and a first online pressure gauge 153. A bottom of the mixing module 110 is connected to a crystal discharge pipe 111. The crystal discharge pipe 111 is provided with a crystal discharge valve 112 adjacent to the mixing module 110. The mixing module 110 is provided with a second online pressure gauge 113. A side wall of the reaction module 120 is connected to a liquid discharge pipe 121. The liquid discharge pipe 121 is provided with a liquid discharge valve 122 adjacent to the reaction module 120. The liquid discharge pipe 121 is further provided with a liquid discharge pump 123. The reaction module 120 is provided with an online pH meter 124. An upper end of a side wall of the clarification module 140 or a top of the clarification module 140 is connected to an outlet pipe 131. The clarification module 140 is provided with an online turbidity meter 132.

The water feeding unit includes a water feeding tank 200. A bottom of the water feeding tank 200 is connected to the mixing module 110 through an inlet pipe 210. The inlet pipe 210 is provided with an inlet valve 211 adjacent to the water feeding tank 200. The inlet pipe 210 is further provided with an inlet pump 212 and a third online pressure gauge 212.

The dosing unit includes a dosing tank 300. A bottom of the dosing tank 300 is connected to the mixing module 110 through a dosing pipe 310. The dosing pipe 310 is provided with a dosing valve 311 adjacent to the dosing tank 300. The dosing pipe 310 is further provided with a dosing pump 312 and a fourth online pressure gauge 313.

The regulation unit includes a secondary sedimentation tank 400. A bottom of the secondary sedimentation tank 400 is connected to an upper end of a side wall of the water feeding tank 200 or a top of the water feeding tank 200 through a crystal supply pipe 410. The crystal supply pipe 410 is provided with a crystal supply valve 411 adjacent to the secondary sedimentation tank 400. The crystal supply pipe 410 is further provided with a crystal supply pump 412. A middle of a side wall of the secondary sedimentation tank 400 is connected to the return pipe 150 through a water supply pipe 420. The water supply pipe 420 is provided with a water supply valve 421 adjacent to the secondary sedimentation tank 400. A top of the secondary sedimentation tank 400 is connected to the reaction module 120 through the liquid discharge pipe 121, and is connected to the clarification module 140 through the outlet pipe 131. An upper end of the side wall of the secondary sedimentation tank 400 is provided with a supernatant overflow port 430.

In some embodiments, the mixing module 110 has an inverted conical shape, the reaction module 120 has a cylindrical shape, the transition module 130 has an inverted truncated-cone shape, and the clarification module 140 has a cylindrical shape.

In some embodiments, a diameter of the clarification module 140 is greater than a diameter of the reaction module 120.

In some embodiments, a lower end of the clarification module 140 is connected to a lower end of the mixing module 110 through the return pipe 150.

In some embodiments, the return pipe 150 is further provided with a first check valve 154 adjacent to the mixing module 110.

In some embodiments, the online pH meter 124 is provided at a bottom end of the reaction module 120.

In some embodiments, the online turbidity meter 132 is provided at the lower end of the clarification module 130 at a position not higher than a connection point of the return pipe 150 to the clarification module 130.

In some embodiments, the water feeding tank 200 is provided with a first agitator 220.

In some embodiments, the inlet pipe 210 is provided with a second check valve 214 adjacent to the mixing module 110.

In some embodiments, the top of the water feeding tank 200 is connected to a saline water delivery pipe 230.

In some embodiments, the dosing tank 300 is provided with a second agitator 320.

In some embodiments, the dosing pipe 310 is provided with a third check valve 314 adjacent to the mixing module 110.

In some embodiments, the secondary sedimentation tank 400 is a sloping plate sedimentation tank.

In some embodiments, the crystal supply pipe 410 is provided with a fourth check valve 413 adjacent to the water feeding tank 200.

In some embodiments, the crystal supply pump 412 is a cutting-type submersible sewage pump.

In some embodiments, the water supply pipe 420 is provided with a fifth check valve 422 adjacent to the return pipe 150.

In some embodiments, a connection between the liquid discharge pipe 121 and the secondary sedimentation tank 400 and a connection between the outlet pipe 131 and the secondary sedimentation tank 400 are higher than the supernatant overflow port 430.

An embodiment of the present disclosure also provides a saline water softening method using the above system, including the following steps.

(S1) In an initial state, the crystallization-softening fluidized bed reactor 100 is filled with softened water, and a liquid level of the softened water is maintained above a connection between the return pipe 150 and the clarification module 140.

A to-be-treated saline water is stored in the water feeding tank 200. A concentration of calcium ions in the to-be-treated saline water is a mg/L, and a concentration of bicarbonate in the to-be-treated saline water is b mg/L, where $a \times b^2 \geq 3.275 \times 10^8$. The to-be-treated saline water is continuously stirred by the first agitator 220.

The pH regulating agent is stored in the dosing tank 300. The pH regulating agent is calcium hydroxide in a form of an emulsion with a weight percentage concentration F, where $1\% \leq F \leq 10\%$. The pH regulating agent is continuously stirred by the second agitator 320.

(S2) The system is activated, a turbidity value of water in the clarification module 140 is measured by the online turbidity meter 132.

If the turbidity value is less than 1500 NTU, the following steps are performed.

The inlet pump 212, the return pump 152 and the dosing pump 312 are activated. The inlet valve 211, the return valve 151 and the dosing valve 311 are opened. The water supply valve 421, the crystal supply valve 411 and the liquid discharge valve 122 are closed. The crystal supply pump 412 and the liquid discharge pump 123 are stopped.

The to-be-treated saline water from the water feeding tank 200 is fed into the mixing module 110 through the inlet pipe 210 at a first preset flow rate $Q_1$ m³/h. The softened water from the clarification module 140 is fed into the mixing module 110 through the return pipe 150 at a second preset flow rate $Q_2$ m³/h. The pH regulating agent from the dosing tank 300 is fed into the mixing module 110 through the dosing pipe 310 at a third preset flow rate $q_3$ m³/h to form a mixed fluid.

In a case that $$a \leq \frac{20}{61}b, \quad Q_2 = \left(\frac{81}{26600}a - 1\right) \times Q_1.$$

In a case that $$a \leq \frac{20}{61}b, \quad Q_2 = \left(\frac{81}{26600}b - 1\right) \times Q_1, \text{ and } q_3 = \frac{Q_1}{1000\,F}.$$

In the above formula, a is the concentration of calcium ions in the to-be-treated saline water, mg/L; b is the concentration of bicarbonate in the to-be-treated saline water, mg/L; and F is the weight percentage concentration of the pH regulating agent.

The mixed fluid in the mixing module 110 is allowed to enter the reaction module 120 to form a fluidized bed composed of solid-phase calcium bicarbonate crystal and liquid-phase softened water. The softened water is directed into the clarification module 140, where one portion of the softened water is allowed to enter the mixing module 110 through the return pipe 150 at the second preset flow rate $Q_2$ m³/h, and the other portion of the softened water is allowed to enter the secondary sedimentation tank 400 through the outlet pipe 131. The softened water in the secondary sedimentation tank 400 is subjected to sedimentation to obtain a supernatant. The supernatant is discharged from the supernatant overflow port 430.

A radius of the reaction module 120 is R, m, and $$R = \sqrt{\frac{Q_1 + Q_2}{4.75\pi}},$$

where $Q_1$ is the first preset flow rate, m³/h, and $Q_2$ is the second preset flow rate, m³/h.

A first preset hydraulic retention time between a top end and a bottom end of the reaction module 120 is defined as $I_1$ h, where $I_1$ is less than or equal to 0.5. A second preset hydraulic retention time between a connection of the liquid discharge pipe 121 on the side wall of the reaction module 120 and the bottom end of the reaction module 120 is defined as $I_2$ h, where $0.25 \leq I_2 \leq I_1 \leq 0.5$.

A third preset hydraulic retention time in the secondary sedimentation tank 400 is defined as $I_3$ h, where $I_3$ is greater than or equal to ⅙ h.

A height from the top end to the bottom end of the reaction module 120 is $H_1$ m, and $$H_1 = \frac{(Q_1 + Q_2) \times I_1}{\pi R^2},$$

where $Q_1$ is the first preset flow rate, m³/h; $Q_2$ is the second preset flow rate, m³/h; R is the radius of the reaction module, m; and $I_1$ is the first preset hydraulic retention time, h.

A height between the connection of the liquid discharge pipe on the side wall of the reaction module and the bottom end of the reaction module is $H_2$ m, and $$H_2 = \frac{(Q_1 + Q_2) \times I_2}{\pi R^2},$$

where $Q_1$ is the first preset flow rate, m³/h; $Q_2$ is the second preset flow rate, m³/h; R is the radius of the reaction module, m; and $I_2$ is the second preset hydraulic retention time, h.

If the turbidity value is greater than or equal to 1500 NTU, the following steps are performed.

The return valve 151 is closed and the water supply valve 421 is opened.

Return of the softened water from the clarification module 140 is stopped, while the supernatant from the secondary sedimentation tank 400 is fed into the mixing module 110 at the second preset flow rate $Q_2$ m³/h through the water supply pipe 420 and the return pipe 150.

The liquid discharge valve 122 is intermittently opened and the liquid discharge pump 123 is intermittently activated.

A fluid located between the connection of the liquid discharge pipe 121 on the side wall of the reaction module 120 and the top end of the reaction module 120 is intermittently discharged into the secondary sedimentation tank 400 through the liquid discharge pipe 121 at a fourth preset flow rate $q_4$ m³/h, and $q_4 > Q_1 + Q_2$, where $Q_1$ is the first preset flow rate, m³/h, and $Q_2$ is the second preset flow rate, m³/h.

Each discharge lasts for $t_1$ h, and an interval between adjacent two discharge operations is $t_2$ h, where $$t_1 = \frac{V + \frac{(H_1 - H_2) \times \pi R^2}{2}}{q_4}, \text{ and } t_2 = \frac{V + \frac{(H_1 - H_2) \times \pi R^2}{2}}{Q_1 + Q_2}.$$

In the above formula, V is a total volume of the transition module 130 and the clarification module 140, m³; $H_1$ is the height from the top end to the bottom end of the reaction module 120, m; $H_2$ is the height between the connection of the liquid discharge pipe 121 on the side wall of the reaction module 120 and the bottom end of the reaction module 120, m; R is the radius of the reaction module 120, m; $Q_1$ is the first preset flow rate, m³/h; and $Q_2$ is the second preset flow rate, m³/h.

During operation of the system, pressure values measured by the second online pressure gauge 113, the third online pressure gauge 213, the first online pressure gauge 153 and the fourth online pressure gauge 313 are denoted as $P_0$, $P_1$, $P_2$, and $P_3$, respectively. When $P_0 > P_1$, $P_0 > P_2$ and $P_0 > P_3$, the crystal discharge valve 112 is closed. When at least one of $P_0 \leq P_1$, $P_0 \leq P_2$, and $P_0 \leq P_3$ is satisfied, the crystal discharge valve 112 is opened, and a portion of calcium bicarbonate crystals is discharged in the form of slurry through the crystal discharge pipe 111.

During operation of the system, when a measured value of the online pH meter 124 is greater than 8.30, the dosing pump 312 is stopped and the dosing valve 311 is closed to stop feeding the pH regulating agent. When the measured value of the online pH meter 124 is less than 8.00, the dosing pump 312 is activated and the dosing valve 311 is opened to start feeding the pH regulating agent. When the measured value of the online pH meter 124 is greater than or equal to 8.00 and less than or equal to 8.30, the dosing pump 312 and the dosing valve 311 are maintained in their current states.

During operation of the system, the crystal supply valve 411 is intermittently opened, and the crystal supply pump 412 is intermittently activated, so as to transfer calcium bicarbonate crystals escaping into the secondary sedimentation tank 400 to the water feeding tank 200 in the form of slurry.

The above operation processes are automatically controlled and executed by the PLC-based control system.

Experimental Example 1

The system and method described above were used to treat high-salinity water in this experimental example, and the initial operating conditions were shown in Table 1. Temporary calcium hardness referred to the potential precipitation amount formed by calcium ions in water in the presence of high levels of dissolved carbonate substances (including carbonates, bicarbonates, carbonic acid and carbon dioxide), usually characterized by the calcium carbonate content.

TABLE 1

| | |
|---|---|
| Temporary calcium hardness of high-salinity water/(mg/L) | ≈5000 |
| Calcium ion concentration in high-salinity water a/(mg/L) | ≈2000 |
| Bicarbonate concentration in high-salinity water b/(mg/L) | 1400 |
| Weight percentage concentration F of pH regulating agent (%) | 10 |
| First preset flow rate $Q_1$ (m³/h) | 0.012 |
| Second preset flow rate $Q_2$ (m³/h) | 0.004 |
| Third preset flow rate $q_3$ (m³/h) | $1.2 \times 10^{-4}$ |
| Fourth preset flow rate $q_4$ (m³/h) | 0.2 |
| First preset hydraulic retention time $I_1$ (h) | ⅓ |
| Second preset hydraulic retention time $I_2$ (h) | ¼ |
| Third preset hydraulic retention time $I_3$ (h) | ½ |
| Radius of reaction module R (m) | 0.0328 |
| Height from top end to bottom end of reaction module $H_1$ (m) | 1.5824 |
| Height between connection of liquid discharge pipe on side wall of reaction module and bottom end of reaction module $H_2$ (m) | 1.1868 |
| Total volume of transition module and clarification module V (m³) | 0.002 |

Other specific values involved in the operation process were calculated according to the formulas.

Experimental Example 2

In this experimental example, high-salinity water was treated using the system and method described above, and the initial operating conditions were shown in Table 2.

TABLE 2

| | |
|---|---|
| Temporary calcium hardness of high-salinity water/(mg/L) | ≈5000 |
| Calcium ion concentration in high-salinity water a/(mg/L) | ≈2000 |
| Bicarbonate concentration in high-salinity water b/(mg/L) | 1400 |
| Weight percentage concentration F of pH regulating agent (%) | 2 |
| First preset flow rate $Q_1$ (m³/h) | 0.006 |
| Second preset flow rate $Q_2$ (m³/h) | 0.002 |
| Third preset flow rate $q_3$ (m³/h) | $3 \times 10^{-4}$ |
| Fourth preset flow rate $q_4$ (m³/h) | 0.2 |
| First preset hydraulic retention time $I_1$ (h) | ½ |
| Second preset hydraulic retention time $I_2$ (h) | ½ |
| Third preset hydraulic retention time $I_3$ (h) | ½ |
| Radius of reaction module R (m) | 0.0232 |
| Height from top end to bottom end of reaction module $H_1$ (m) | 2.3737 |
| Height between connection of liquid discharge pipe on side wall of reaction module and bottom end of reaction module $H_2$ (m) | 2.3737 |
| Total volume of transition module and clarification module V (m³) | 0.002 |

Figure 2:
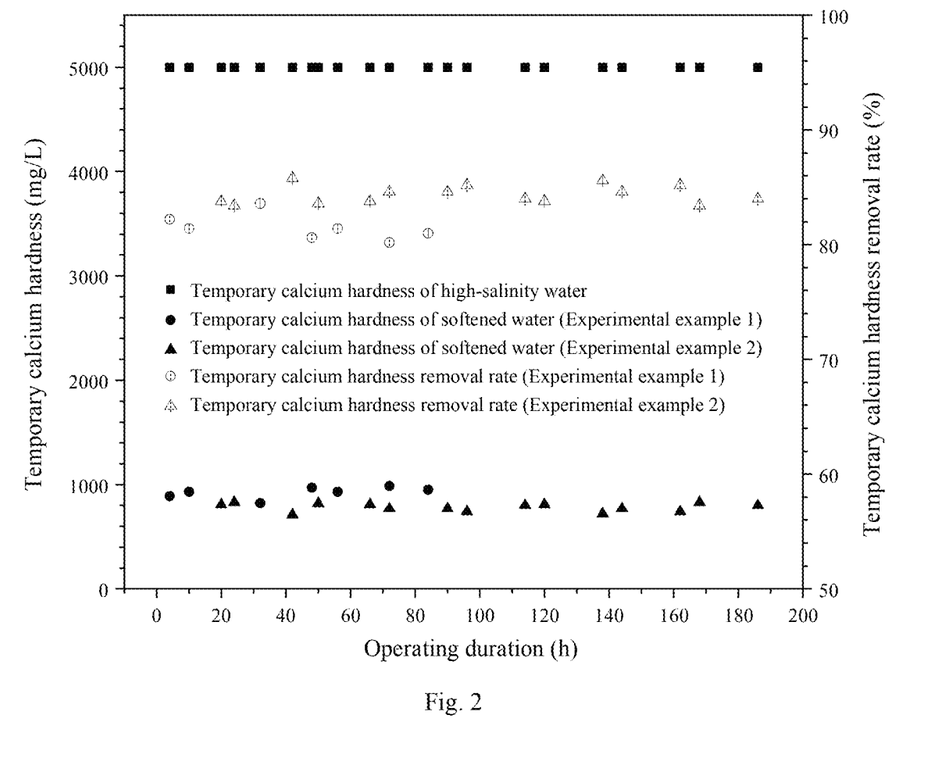
FIG. 2 schematically shows a variation of temporary calcium hardness over the operating duration of the system in Experimental Example 1 and Experimental Example 2 of the present disclosure.

The variation of temporary calcium hardness over the operating duration of the system in Experimental Example 1 and Experimental Example 2 was shown in FIG. 2. As shown in FIG. 2, a good removal effect of temporary hardness caused by calcium ions in the high-salinity water was achieved (with a removal rate of approximately 80-85%) and no significant attenuation was observed during operation.

Comparative Example 1

In this comparative example, the crystallization apparatus and treatment method disclosed in Chinese patent publication No. 114873745A were employed to treat high-salinity water, which was the same as that used in Experimental Example 1.

The particle size distribution of the calcium bicarbonate crystal products obtained after 186 h of operation in Experimental Example 2 and Comparative Example 1 was measured and calculated, and the results were shown in Table 3.

TABLE 3

| | Particle size range | | | | | | | |
|---|---|---|---|---|---|---|---|---|
| | 0-10 μm | 10-20 μm | 20-30 μm | 30-40 μm | 40-50 μm | 50-100 μm | 100-200 μm | >200 μm |
| System operated for 186 h in Comparative Example 1 | | | | | | | | |
| Volume percentage | 37.04% | 40.16% | 15.23% | 5.22% | 2% | 0.35% | 0% | 0% |
| Median particle size | | | | | | 15 μm | | |
| System operated for 186 h in Experimental Example 2 | | | | | | | | |
| Volume percentage | 0% | 0% | 0% | 0% | 0% | 1.58% | 72.14% | 26.28% |
| Median particle size | | | | | | 173 μm | | |

Based on Table 3, compared with Comparative Example 1, a significant increase of at least 10 times in the particle size of calcium bicarbonate crystal products was achieved in Experimental Example 2 by using the system and method disclosed herein.

It should be noted that, as used herein, terms such as "first" and "second" are only descriptive, and should not be construed as indicating or implying their relative importance or implicitly specifying the number of technical features indicated. Moreover, the terms "comprise", "include" or any other variants thereof are intended to cover non-exclusive inclusion, such that a process, method, article, or apparatus that comprises a list of elements does not include only those elements, but may also include other elements not expressly listed or elements inherent to such process, method, article, or apparatus. In the absence of additional limitations, an element defined by the phrase "comprising a . . . " does not exclude the presence of additional elements of the same type in a process, method, article, or apparatus that comprises the stated element.

Described embodiments are merely illustrative, and are not intended to limit the scope of the present disclosure. It should be understood that various modifications, changes and replacements made by those skilled in the art without departing from the spirit of the disclosure shall fall within the scope of the present disclosure defined by the appended claims.

What is claimed is:

1. A system for softening saline water via self-induced calcium bicarbonate crystallization in fluidized bed, comprising:
    a fluidized bed-based crystallization-softening reaction unit;
    a water feeding unit;
    a dosing unit; and
    a regulation unit;
    wherein the fluidized bed-based crystallization-softening reaction unit is configured to induce a crystallization reaction to soften a saline water;
    the water feeding unit is configured to supply the saline water to the fluidized bed-based crystallization-softening reaction unit;
    the dosing unit is configured to supply a pH regulating agent to the fluidized bed-based crystallization-softening reaction unit;
    the regulation unit is configured to perform reflux replenishment for the fluidized bed-based crystallization-softening reaction unit and recover escaping crystals;
    the fluidized bed-based crystallization-softening reaction unit comprises a crystallization-softening fluidized bed reactor;
    the crystallization-softening fluidized bed reactor comprises a mixing module, a reaction module, a transition module and a clarification module sequentially connected from bottom to top; wherein
        the mixing module has an inverted conical shape, the reaction module has a cylindrical shape, the transition module has an inverted truncated-cone shape, and the clarification module has a cylindrical shape;
        the clarification module is connected to the mixing module through a return pipe;
        an end of the return pipe adjacent to the clarification module is provided with a return valve; and the return pipe is further provided with a return pump and a first online pressure gauge; and the return pipe is provided with a check valve adjacent to the mixing module;
    a bottom of the mixing module is connected to a crystal discharge pipe; the crystal discharge pipe is provided with a crystal discharge valve adjacent to the mixing module; and the mixing module is provided with a second online pressure gauge;
    a side wall of the reaction module is connected to a liquid discharge pipe; the liquid discharge pipe is provided with a liquid discharge valve adjacent to the reaction module; the liquid discharge pipe is further provided with a liquid discharge pump; and the reaction module is provided with an online pH meter, wherein the online pH meter is provided at a bottom end of the reaction module;
    an upper end of a side wall of the clarification module or a top of the clarification module is connected to an outlet pipe; and the clarification module is provided with an online turbidity meter;
    a diameter of the clarification module is greater than a diameter of the reaction module;
    a lower end of the clarification module is connected to a lower end of the mixing module through the return pipe; and
    the online turbidity meter is provided at the lower end of the clarification module at a position not higher than a connection point of the return pipe to the clarification module;
    the water feeding unit comprises a water feeding tank; a bottom of the water feeding tank is connected to the mixing module through an inlet pipe; the inlet pipe is provided with an inlet valve adjacent to the water feeding tank; and the inlet pipe is further provided with an inlet pump and a third online pressure gauge;
    the dosing unit comprises a dosing tank; a bottom of the dosing tank is connected to the mixing module through a dosing pipe; the dosing pipe is provided with a dosing valve adjacent to the dosing tank; and the dosing pipe is further provided with a dosing pump and a fourth online pressure gauge;
    the regulation unit comprises a secondary sedimentation tank; a bottom of the secondary sedimentation tank is connected to an upper end of a side wall of the water feeding tank or a top of the water feeding tank through a crystal supply pipe; the crystal supply pipe is provided with a crystal supply valve adjacent to the secondary sedimentation tank; and the crystal supply pipe is further provided with a crystal supply pump;
    a middle of a side wall of the secondary sedimentation tank is connected to the return pipe through a water supply pipe; and the water supply pipe is provided with a water supply valve adjacent to the secondary sedimentation tank;
    a top of the secondary sedimentation tank is connected to the reaction module through the liquid discharge pipe, and is connected to the clarification module through the outlet pipe; and
    an upper end of the side wall of the secondary sedimentation tank is provided with a supernatant overflow port.

2. The system according to claim 1, wherein the water feeding tank is provided with a first agitator;
    the inlet pipe is provided with a first check valve adjacent to the mixing module;
    the top of the water feeding tank is connected to a saline water delivery pipe;
    the dosing tank is provided with a second agitator;
    the dosing pipe is provided with a second check valve adjacent to the mixing module;

the secondary sedimentation tank is a sloping plate sedimentation tank;
the crystal supply pipe is provided with a third check valve adjacent to the water feeding tank;
the water supply pipe is provided with a fourth check valve adjacent to the return pipe; and
a connection between the liquid discharge pipe and the secondary sedimentation tank and a connection between the outlet pipe and the secondary sedimentation tank are higher than the supernatant overflow port.

3. The system according to claim 1, further comprising:
a programmable logic controller (PLC)-based control system;
wherein the PLC-based control system is configured to control the fluidized bed-based crystallization-softening reaction unit, the water feeding unit, the dosing unit and the regulation unit to achieve automated operation.

4. A saline water softening method, the method being performed by the system of claim 2, the method comprising:
(S1) in an initial condition, filling the fluidized bed-based crystallization-softening reactor with softened water, and maintaining a liquid level of the softened water above a connection between the return pipe and the clarification module;
storing a to-be-treated saline water in the water feeding tank, wherein a concentration of calcium ions in the to-be-treated saline water is a mg/L, a concentration of bicarbonate in the to-be-treated saline water is b mg/L, and $a \times b^2 \geq 3.275 \times 10^8$; and
storing the pH regulating agent in the dosing tank, wherein the pH regulating agent is in a form of an emulsion with a weight percentage concentration F, wherein $1\% \leq F \leq 10\%$;
(S2) activating the system; measuring, by the online turbidity meter, a turbidity value of water in the clarification module;
if the turbidity value is less than 1500 NTU, proceeding to the following steps:
  activating the inlet pump, the return pump and the dosing pump; opening the inlet valve, the return valve and the dosing valve; closing the water supply valve, the crystal supply valve and the liquid discharge valve; and stopping the crystal supply pump and the liquid discharge pump;
  feeding the to-be-treated saline water from the water feeding tank into the mixing module through the inlet pipe at a first preset flow rate $Q_1$ m³/h; feeding the softened water from the clarification module into the mixing module through the return pipe at a second preset flow rate $Q_2$ m³/h; and feeding the pH regulating agent from the dosing tank into the mixing module through the dosing pipe at a third preset flow rate $q_3$ m³/h to form a mixed fluid;
  allowing the mixed fluid to enter the reaction module to form a fluidized bed composed of solid-phase calcium bicarbonate crystal and liquid-phase softened water; transferring the softened water into the clarification module, wherein one portion of the softened water is allowed to enter the mixing module through the return pipe at the second preset flow rate $Q_2$ m³/h, and the other portion of the softened water is allowed to enter the secondary sedimentation tank through the outlet pipe; and subjecting the softened water in the secondary sedimentation tank to sedimentation to obtain a supernatant, and discharging the supernatant from the supernatant overflow port;
  defining a first preset hydraulic retention time between a top end and a bottom end of the reaction module as $I_1$ h, wherein $I_1$ is less than or equal to 0.5; and
  defining a second preset hydraulic retention time between a connection of the liquid discharge pipe on the side wall of the reaction module and the bottom end of the reaction module as $I_2$ h, wherein $0.25 \leq I_2 \leq I_1 \leq 0.5$;
if the turbidity value is greater than or equal to 1500 NTU, proceeding to the following steps:
  closing the return valve, and opening the water supply valve;
  stopping return of the softened water from the clarification module, and feeding the supernatant from the secondary sedimentation tank into the mixing module at the second preset flow rate $Q_2$ m³/h through the water supply pipe and the return pipe;
  intermittently opening the liquid discharge valve and activating the liquid discharge pump;
  intermittently discharging a fluid located between the connection of the liquid discharge pipe on the side wall of the reaction module and the top end of the reaction module into the secondary sedimentation tank through the liquid discharge pipe at a fourth preset flow rate $q_4$ m³/h;
  denoting pressure values measured by the second online pressure gauge, the third online pressure gauge, the first online pressure gauge and the fourth online pressure gauge as $P_0$, $P_1$, $P_2$, and $P_3$, respectively;
  in a case that $P_0 > P_1$, $P_0 > P_2$ and $P_0 > P_3$, closing the crystal discharge valve; and
  in a case that at least one of $P_0 \leq P_1$, $P_0 \leq P_2$, and $P_0 \leq P_3$ is satisfied, opening the crystal discharge valve.

5. The method according to claim 4, wherein in the system, continuous stirring is performed in the water feeding tank and the dosing tank respectively by the first agitator and the second agitator; and/or
the pH regulating agent comprises calcium hydroxide.

6. The method according to claim 4, wherein in a case that $$a \leq \frac{20}{61}b, \quad Q_2 = \left(\frac{81}{26600}a - 1\right) \times Q_1;$$

in a case that $$a > \frac{20}{61}b, \quad Q_2 = \left(\frac{81}{81130}b - 1\right) \times Q_1; \text{ and } q_3 = \frac{Q_1}{1000\,F};$$

wherein a is the concentration of calcium ions in the to-be-treated saline water, mg/L; b is the concentration of bicarbonate in the to-be-treated saline water, mg/L; and F is the weight percentage concentration of the pH regulating agent.

7. The method according to claim 6, wherein a radius of the reaction module is R, m, and $$R = \sqrt{\frac{Q_1 + Q_2}{4.75\pi}},$$

wherein $Q_1$ is the first preset flow rate, m³/h, and $Q_2$ is the second preset flow rate, m³/h;
a height from the top end to the bottom end of the reaction module is $H_1$ m, and $$H_1 = \frac{(Q_1 + Q_2) \times I_1}{\pi R^2},$$

wherein $Q_1$ is the first preset flow rate, m³/h, $Q_2$ is the second preset flow rate, m³/h, R is the radius of the reaction module, m, and $I_1$ is the first preset hydraulic retention time, h;

a height between the connection of the liquid discharge pipe on the side wall of the reaction module and the bottom end of the reaction module is $H_2$ m, and $$H_2 = \frac{(Q_1 + Q_2) \times I_2}{\pi R^2},$$

wherein $Q_1$ is the first preset flow rate, m³/h, $Q_2$ is the second preset flow rate, m³/h, R is the radius of the reaction module, m, and $I_2$ is the second preset hydraulic retention time, h;

a third preset hydraulic retention time in the secondary sedimentation tank is $I_3$ h, and $I_3$ is greater than or equal to 1/6 h;

in a case that a measured value of the online pH meter is greater than 8.30, stopping the dosing pump and closing the dosing valve to stop feeding the pH regulating agent;

in a case that the measured value of the online pH meter is less than 8.00, activating the dosing pump and opening the dosing valve to start feeding the pH regulating agent; and in a case that the measured value of the online pH meter is greater than or equal to 8.00 and less than or equal to 8.30, maintaining the dosing pump and the dosing valve in their current states, respectively.

8. The method according to claim 7, wherein in the step of intermittently discharging the fluid between the connection of the liquid discharge pipe on the side wall of the reaction module and the top end of the reaction module into the secondary sedimentation tank through the liquid discharge pipe at the fourth preset flow rate $q_4$ m³/h:

$q_4 > Q_1 + Q_2$, wherein $Q_1$ is the first preset flow rate, m³/h; and $Q_2$ is the second preset flow rate, m³/h;

each discharge lasts for $t_1$ h, and an interval between adjacent two discharge operations is $t_2$ h;

wherein $$t_1 = \frac{V + \frac{(H_1 - H_2) \times \pi R^2}{2}}{q_4}; \text{ and } t_2 = \frac{V + \frac{(H_1 - H_2) \times \pi R^2}{2}}{Q_1 + Q_2};$$

wherein V is a total volume of the transition module and the clarification module, m³; $H_1$ is the height from the top end to the bottom end of the reaction module, m; $H_2$ is the height between the connection of the liquid discharge pipe on the side wall of the reaction module and the bottom end of the reaction module, m; R is the radius of the reaction module, m; $Q_1$ is the first preset flow rate, m³/h; and $Q_2$ is the second preset flow rate, m³/h.

9. The method according to claim 5, wherein during operation of the system, the crystal supply valve is intermittently opened, and the crystal supply pump is intermittently activated, so as to transfer calcium bicarbonate crystals escaping into the secondary sedimentation tank to the water feeding tank in a form of slurry.

\* \* \* \* \*